J. O. BROOK.
ATTACHMENT FOR USE WITH REAPERS, THRESHERS, AND THE LIKE.
APPLICATION FILED APR. 13, 1917.

1,367,533.

Patented Feb. 8, 1921.

Inventor
John Oliver Brook.
Attorney

UNITED STATES PATENT OFFICE.

JOHN OLIVER BROOK, OF CURBAN, NEW SOUTH WALES, AUSTRALIA, ASSIGNOR OF ONE-HALF TO ARCHIBALD ROGERS, OF HAVILAH, NEW SOUTH WALES, AUSTRALIA.

ATTACHMENT FOR USE WITH REAPERS, THRESHERS, AND THE LIKE.

1,367,533.     Specification of Letters Patent.     Patented Feb. 8, 1921.

Application filed April 13, 1917. Serial No. 161,928.

*To all whom it may concern:*

Be it known that I, JOHN OLIVER BROOK, a subject of the King of Great Britain and Ireland, and a resident of Hillside, Curban, in the State of New South Wales, Commonwealth of Australia, have invented certain new and useful Improvements in Attachments for Use with Reapers, Threshers, and the like, of which the following is a specification.

This invention consists of an improved attachment to assist the canvas conveyer of reaper-threshers, header-reapers and the like, in the conveying of the cut crop from the reaping appliances to the traveler or appliance which transfers it to the threshing drum.

The attachment is assembled at the rear of the front reel and from four to eight inches above the canvas conveyer and is constructed of a rod or bar extending about three quarters of the length of the canvas conveyer, said rod or bar being preferably of iron with such as sheet metal spread teeth, or jaws, or prongs of such a form as to engage and help to force the cut crop forward along with the canvas conveyer and release the said cut crop in its backward movement.

The invention will now be fully described aided by a reference to the accompanying sheet of drawings which illustrates one form of the appliance and means of driving it.

Figure 1:
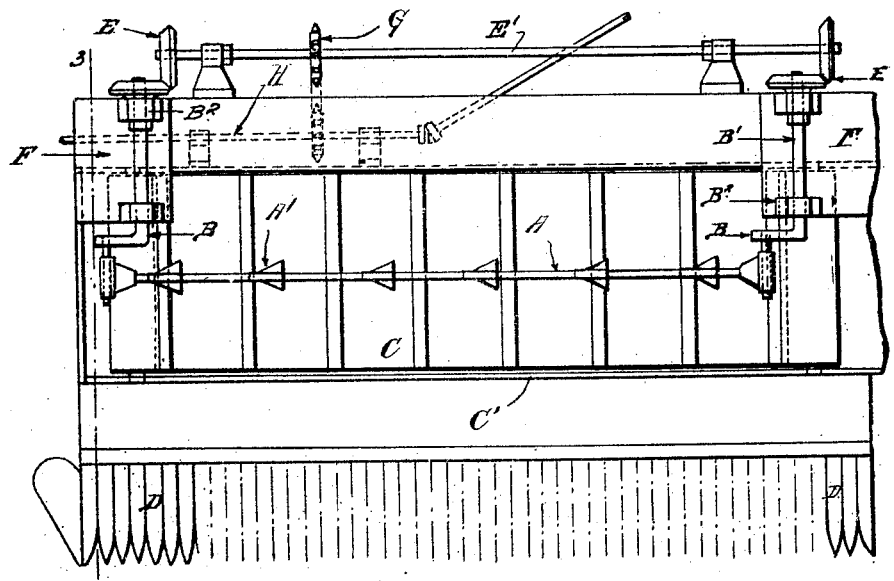

Figure 1 showing a plan of the attachment in its working position and

Figure 2:
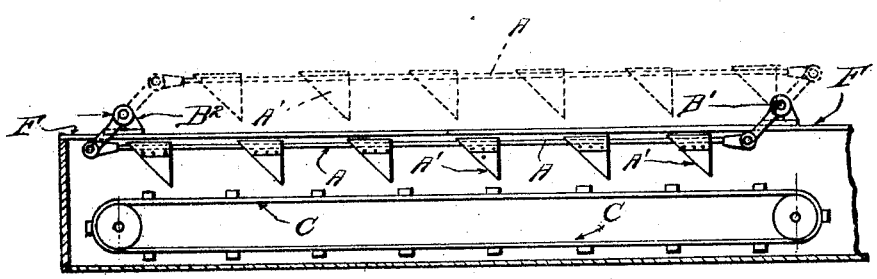

Fig. 2 a front view of same while

Figure 3:
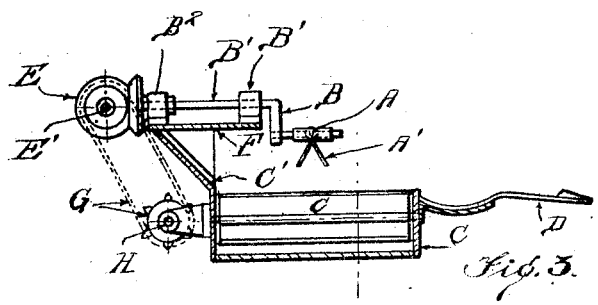

Fig. 3 is a transverse sectional view on line 3—3 of Fig. 1.

The aforesaid metal rod A is carried at each end by a crank arm B on the spindles $B^1$ so that the teeth or jaws $A^1$ on the rod will engage and force the crop forward in its downward and forward movement and rise to a position clear of it in its upward and backward movement. C is the canvas conveyer and $C^1$ the framing or trough in which it is supported, and D the stripper comb although the latter may be substituted by a reciprocating knife or sickle. Provision may be made for adjusting the height of the swinging toothed rod A above the conveyer C, while its length may be varied to suit the length of conveyers.

A bevel pinion E is arranged on the end of each crank spindle $B^1$, the latter being supported in bearings $B^2$ carried by plate pieces F seated on and secured to the top of the platform trough or framing and located at the fore and rear ends of platform so that the crank spindles carried by them will support the auxiliary toothed bar A—$A^1$ longitudinally above the canvas table C whereat it rotates or swings with the cranks.

The crank spindles $B^1$ of the attachment are driven by the pairs of bevel pinions E deriving motion from the suitably supported lay spindle $E^1$ driven by chain and sprocket gear G from the spindle H which is usually arranged along the rear of the platform of such machines and imparts the required speed.

In the present machines, when the straw becomes dry and light there is not weight enough in it to cause the straw to travel with and at the same rate, as the moving canvas conveyer, hence it does not ride firmly on the canvas, but with this attachment the reciprocating toothed or jagged presser rod operated by the two aforesaid crank spindles presses the cut crop on the canvas and so pushes or carries it along with the conveyer which then gives a regular feed to the drum.

In the drawings I have illustrated one means of supporting and driving the toothed rod but it is obvious that without departing from my invention, other means may be employed in order to suit the machine upon which it is to be fitted.

Having now described my invention what I claim as new and desire to secure by Letters Patent is:—

In a harvesting machine, a trough, a horizontally disposed conveyer belt mounted for movement in said trough, plates on said trough, bearings carried by said plates, base shafts journaled in said bearings, single cranks on the corresponding ends of said shaft, pins carried by said cranks, a horizontally disposed rod spanning the space between said pins and disposed above said belt, sleeves formed on the ends of said rod and loosely receiving said pins, splayed teeth carried at regular intervals on said rod, a comb supported at one side of said trough, and means for driving said shafts in synchronism.

In testimony whereof I have signed my name to this specification in the presence of two subscribing witnesses.

JOHN OLIVER BROOK.

Witnesses:
BEDLINGTON BODYCOMB,
LESLIE LAWTON BEAR.